(12) United States Patent
Miles

(10) Patent No.: US 6,880,683 B1
(45) Date of Patent: Apr. 19, 2005

(54) BRAKE DISC HAVING AIR CIRCULATING FAN BLADES

(76) Inventor: Lynn Allan Miles, 21F-1, No. 789, Chong Ming South Road, Taichung (TW) 402

( * ) Notice: Subject to any disclaimer, the term of this patent is extended or adjusted under 35 U.S.C. 154(b) by 0 days.

(21) Appl. No.: 10/705,697

(22) Filed: Nov. 10, 2003

(51) Int. Cl.[7] .............................................. F16D 65/12
(52) U.S. Cl. ........................... 188/218 XL; 188/264 A; 188/264 AA
(58) Field of Search ........................... 188/26, 218 XL, 188/264 A, 264 AA, 18 A, 218 A, 218 R, 188/205 A, 206 R

(56) References Cited

U.S. PATENT DOCUMENTS

| | | | |
|---|---|---|---|
| 3,773,153 A | * | 11/1973 | Smirl .................... 188/218 XL |
| 4,848,521 A | * | 7/1989 | Izumine ..................... 188/18 A |
| 6,135,248 A | * | 10/2000 | Johnson et al. ........ 188/218 XL |
| 6,206,144 B1 | | 3/2001 | Di Bella ....................... 188/26 |
| 6,230,849 B1 | | 5/2001 | Lumpkin ................. 188/24.12 |
| 6,260,669 B1 | * | 7/2001 | Daudi ........................ 188/71.6 |
| 6,457,566 B1 | * | 10/2002 | Toby ..................... 188/1.11 W |
| 6,536,564 B1 | * | 3/2003 | Garfinkel et al. ........ 188/264 A |

* cited by examiner

Primary Examiner—Chris Schwartz
(74) Attorney, Agent, or Firm—Charles E. Baxley

(57) ABSTRACT

A brake disc for cycle brake systems includes an outer peripheral portion, a hub portion, and an air circulating device attached to the brake disc, and inclined relative to the brake disc, to propel and circulate air around the brake disc when the brake disc is rotated. For example, the air circulating device includes a number of spokes or fan blades secured between the outer peripheral portion and the hub portion of the brake disc, and inclined relative to the brake disc. The fan blades may be secured to the spokes.

3 Claims, 4 Drawing Sheets

BRAKE DISC HAVING AIR CIRCULATING FAN BLADES

BACKGROUND OF THE INVENTION

1. Field of the Invention

The present invention relates to a brake disc for cycle brake systems, and more particularly to a brake disc for cycle brake systems having one or more air circulating fan blades formed or provided therein for air circulating purposes for the brake discs.

2. Description of the Prior Art

Various kinds of typical disc brake devices or systems have been developed and provided for braking cycles, and comprise a brake disc having an outer peripheral portion to be arranged and disposed between two brake shoes which may be forced against the outer peripheral portion of the brake disc for conducting the braking operations.

For decreasing the weights of the brake discs, a number of spokes are formed and provided between the outer peripheral portion of the brake disc and a hub portion of the brake disc, in order to form or define a number of openings within the brake disc.

For example, U.S. Pat. No. 6,206,144 to Di Bella, and U.S. Pat. No. 6,230,849 to Lumpkin disclose two of the typical disc brake devices each including a number of spokes formed between the outer peripheral portion and the hub portion of the brake disc, for decreasing the weights of the brake discs.

However, the spokes are normally formed or punched from a planar member, such that the spokes are normally parallel to the brake discs, particularly parallel to the outer peripheral portion and/or the hub portion of the brake disc, such that the spokes may not be used for paddling air or may not be used for air circulating or ventilating purposes.

The typical disc brake devices or systems fail to provide one or more air circulating fan blades formed or provided within the brake discs for air circulating purposes.

The present invention has arisen to mitigate and/or obviate the afore-described disadvantages of the conventional brake discs for cycle brake systems.

SUMMARY OF THE INVENTION

The primary objective of the present invention is to provide a brake disc for cycle brake systems including one or more air circulating fan blades formed or provided therein for air circulating purposes and for decreasing the temperature of the brake discs while conducting the braking operations.

In accordance with one aspect of the invention, there is provided a brake disc for cycle brake systems, the brake disc comprising an outer peripheral portion, a hub portion, and an air circulating device provided on the brake disc, and inclined relative to the brake disc, to propel and circulate air around the brake disc when the brake disc is rotated.

The air circulating device includes a number of spokes secured between the outer peripheral portion and the hub portion of the brake disc, and inclined relative to the brake disc, to propel and circulate air around the brake disc when the brake disc is rotated. Foe example, the spokes may be formed integral with the brake disc.

The air circulating device includes a number of fan blades secured between the outer peripheral portion and the hub portion of the brake disc. For example, a number of spokes are secured between the outer peripheral portion and the hub portion of the brake disc, and the fan blades are secured to the spokes. A number of pads may be disposed between the fan blades and the spokes, to inclinedly secured the fan blades to the brake disc.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
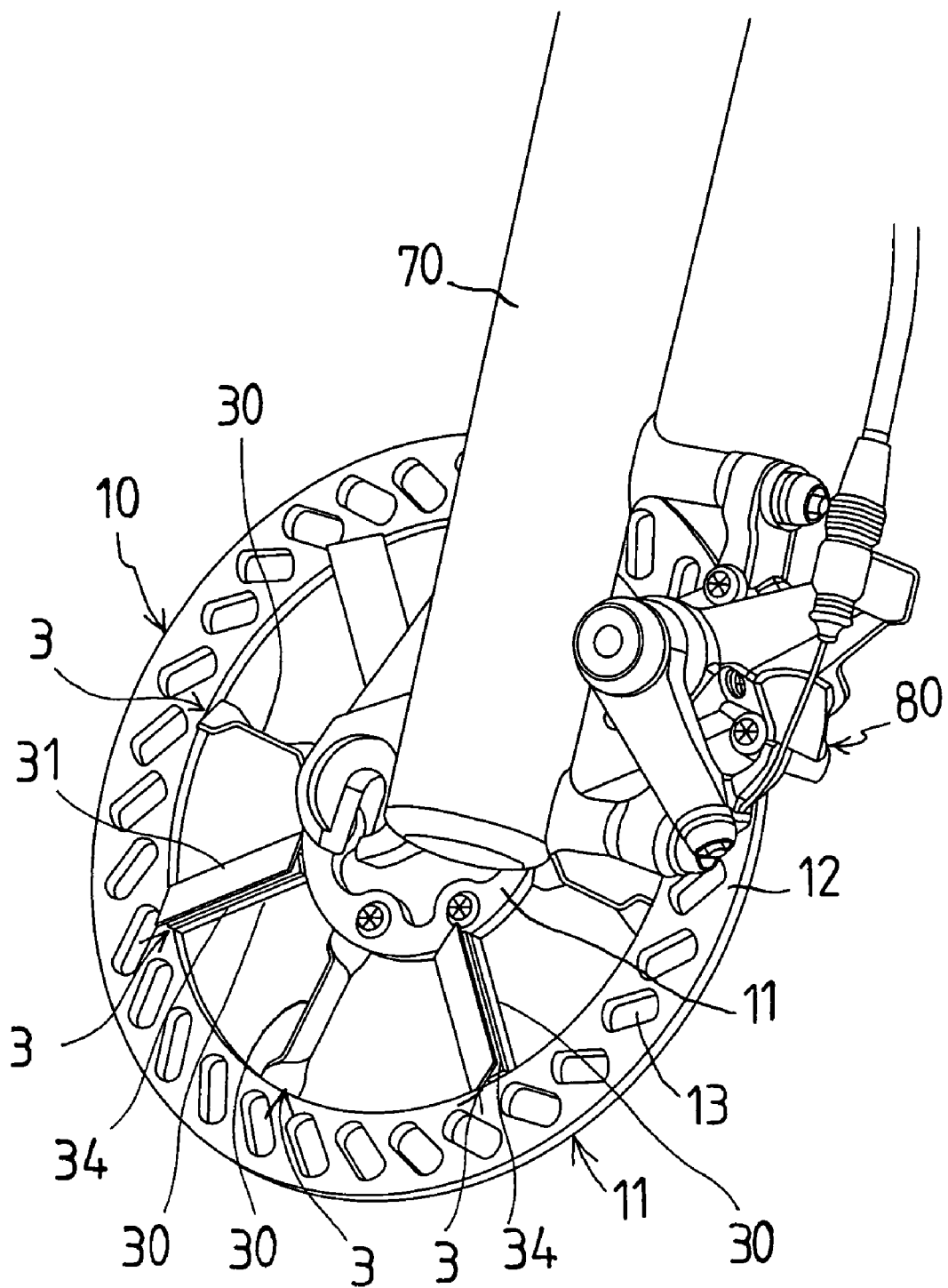
FIG. 1 is a perspective view illustrating an attachment of a brake disc for cycle brake systems in accordance with the present invention to a cycle frame.
Figure 2:
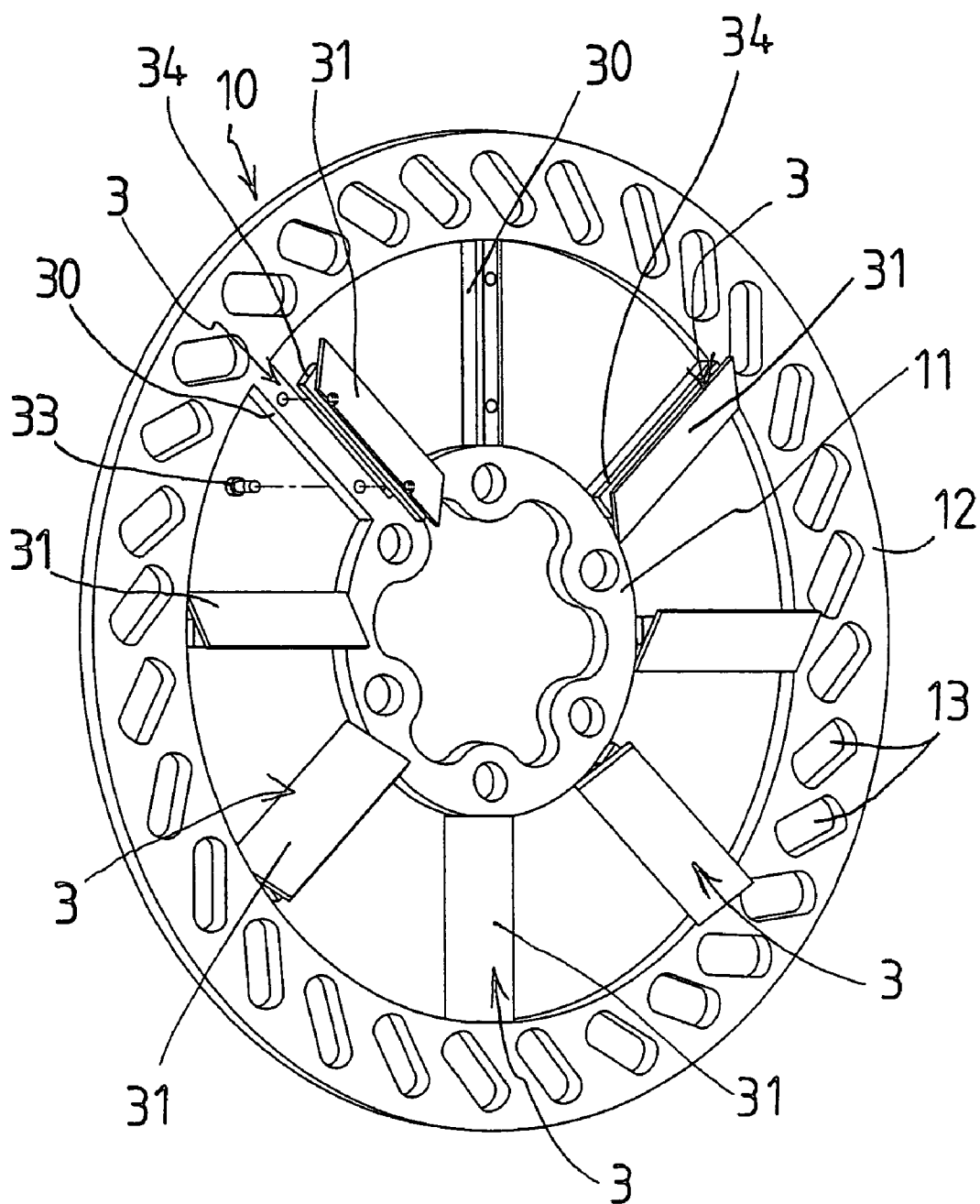
FIG. 2 is a perspective view of the brake disc for cycle brake systems.

Referring to the drawings, and initially to FIGS. 1–2, a brake disc 10 for cycle brake systems in accordance with the present invention comprises a hub portion 11 provided for rotatably attaching to a fork or a cycle frame 70, and comprises an outer peripheral portion 12 to be arranged and disposed between two brake shoes (not shown) of a brake device 80 which may be forced against the outer peripheral portion 12 of the brake disc 10 for conducting the braking operations.

For increasing the air ventilating effect of the brake disc, a number of holes or orifices 13 are provided and formed within the outer peripheral portion 12 of the brake disc 10, and formed through the brake disc 10, for allowing air to circulate or to flow through the brake disc 10.

The brake disc 10 further includes one or more spokes 30 formed or provided between the hub portion 11 and the outer peripheral portion 12 thereof, for supporting the hub portion 11 and the outer peripheral portion 12 thereof together. The above-described structure for the brake disc 10 is typical and will not be described in further details.

Referring next to FIGS. 2–5, one or more of the spokes 30 of the brake disc 10 are arranged or secured or formed to be inclined relative to the brake disc 10, and may be inclined relative to the brake disc 10 for different angular positions to form as an air circulating device 3, in order to generate air or to propel the air and for air circulating purposes and for decreasing the temperature of the brake discs while conducting the braking operations.

Figure 3:
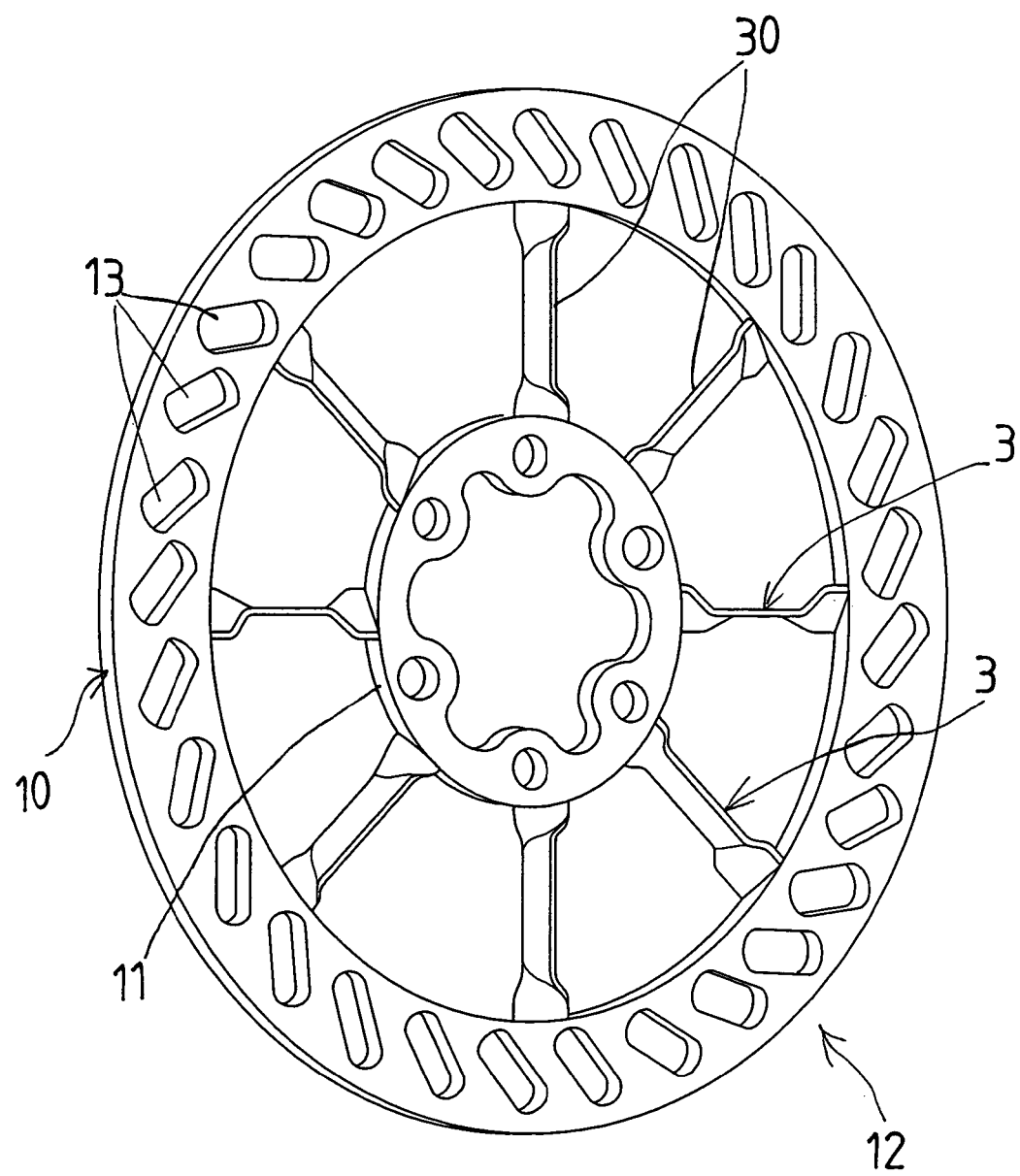
FIG. 3 is a perspective view similar to FIG. 2, illustrating the other arrangement of the brake disc.
Figure 4:
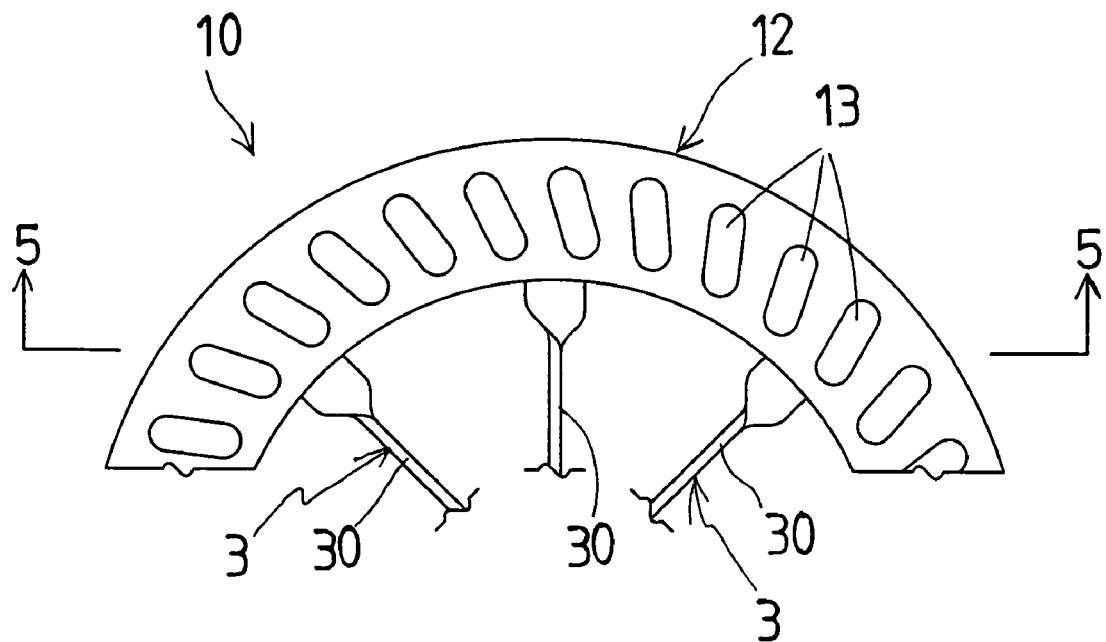
FIG. 4 is a partial plan schematic view of the brake disc for cycle brake systems.
Figure 5:
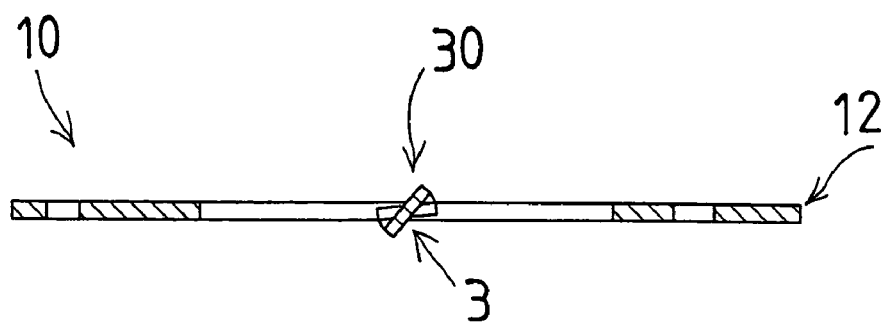
FIG. 5 is a partial cross sectional view taken along lines 5—5 of FIG. 4, illustrating the operation of the brake disc for cycle brake systems.

As shown in FIGS. 2 and 3, one or more of the spokes 30 of the brake disc 10 may be formed or secured to the brake disc 10 by such as molding processes, forging processes, or the like. For example, as shown in FIG. 3, all of the spokes 30 of the brake disc 10 may be formed integral with the brake disc 10, and arranged to be inclined relative to the brake disc 10.

As shown in FIG. 2, the air circulating device 3 may further include one or more fan blades 31 directly secured to the brake disc 10, or formed separately and then secured onto the spokes 30 with such as fasteners 33, latches, or the like, and also arranged to be inclined relative to the brake disc 10.

For example, one or more pads 34 may further be provided and engaged or secured between the spokes 30 and the fan blades 31 respectively, to inclinedly support or secure the fan blades 31 to the spokes 30 or directly to the brake disc 10 respectively.

In operation, when the brake disc 10 is rotated relative to the cycle frame 70, the inclination of the spokes 30 and/or the fan blades 31 of the air circulating device 3 relative to the brake disc 10 allows the inclined spokes 30 and/or the fan blades 31 to propel the air around the brake disc 10, and to circulate the air, and to cool the brake disc which may normally include an increased temperature while conducting the braking operations.

Accordingly, the brake disc for cycle brake systems includes one or more air circulating fan blades formed or provided therein for air circulating purposes and for decreasing the temperature of the brake discs while conducting the braking operations.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake disc for cycle brake systems, said brake disc comprising:

an outer peripheral portion, a hub portion, an air circulating device provided on said brake disc, and inclined relative to said brake disc, to propel and circulate air around said brake disc when said brake disc is rotated, said air circulating device including a plurality of fan blades secured between said outer peripheral portion and said hub portion of said brake disc, and including a plurality of spokes secured between said outer peripheral portion and said hub portion of said brake disc, and said fan blades being secured to said spokes, and a plurality of pads disposed between said fan blades and said spokes, to inclinedly secure said fan blades to said brake disc.

2. The brake disc as claimed in claim 1, wherein said spokes are inclined relative to said brake disc, to propel and circulate air around said brake disc when said brake disc is rotated.

3. The brake disc as claimed in claim 2, wherein said spokes are formed integral with said brake disc.

* * * * *